US009162308B2

(12) United States Patent
Peters

(10) Patent No.: US 9,162,308 B2
(45) Date of Patent: Oct. 20, 2015

(54) APPARATUS AND METHOD FOR PULSE WELDING WITH AC WAVEFORM

(75) Inventor: Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 909 days.

(21) Appl. No.: 13/293,112

(22) Filed: Nov. 9, 2011

(65) Prior Publication Data

US 2012/0097656 A1 Apr. 26, 2012

Related U.S. Application Data

(63) Continuation-in-part of application No. 13/267,153, filed on Oct. 6, 2011.

(60) Provisional application No. 61/405,895, filed on Oct. 22, 2010, provisional application No. 61/413,007, filed on Nov. 12, 2010.

(51) Int. Cl.
*B23K 9/10* (2006.01)
*B23K 9/09* (2006.01)
*B23K 9/095* (2006.01)

(52) U.S. Cl.
CPC .............. *B23K 9/091* (2013.01); *B23K 9/095* (2013.01); *B23K 9/1043* (2013.01)

(58) Field of Classification Search
USPC ........................................ 219/130.51, 137 R
See application file for complete search history.

(56) References Cited

U.S. PATENT DOCUMENTS

| 3,349,219 | A | * | 10/1967 | Ramsey | 219/130.51 |
| 3,510,676 | A | * | 5/1970 | Pierce, Jr. | 307/108 |
| 4,288,682 | A | | 9/1981 | Toth | |
| 4,544,826 | A | | 10/1985 | Nakanishi et al. | |
| 4,553,018 | A | * | 11/1985 | Kondo et al. | 219/130.51 |
| 4,835,360 | A | | 5/1989 | Parks et al. | |
| 4,885,453 | A | | 12/1989 | Martin | |
| 4,889,969 | A | * | 12/1989 | Kawai et al. | 219/130.51 |

(Continued)

FOREIGN PATENT DOCUMENTS

| CN | 1803369 A | 7/2006 |
| CN | 101058124 A | 10/2007 |

(Continued)

OTHER PUBLICATIONS

International Search Report and Written Opinion dated Mar. 8, 2013.

(Continued)

*Primary Examiner* — Dana Ross
*Assistant Examiner* — Renee L Miller
(74) *Attorney, Agent, or Firm* — Perkins Coie LLP

(57) ABSTRACT

A pulse welding welder is provided which provides a pulse welding waveform to a workpiece to be welded. The welding waveform has a plurality of welding cycles and each of the cycles has a droplet transfer peak pulse and a background portion with a first polarity and an opposite polarity portion which precedes the droplet transfer peak pulse and is after the background portion.

20 Claims, 11 Drawing Sheets

(56) References Cited

U.S. PATENT DOCUMENTS

| | | | |
|---|---|---|---|
| 4,954,691 A | 9/1990 | Parks et al. | |
| 5,270,516 A | 12/1993 | Hamamoto et al. | |
| 6,051,810 A * | 4/2000 | Stava | 219/137 PS |
| 6,111,216 A * | 8/2000 | Stava | 219/130.51 |
| 6,215,100 B1 | 4/2001 | Stava | |
| 6,940,040 B2 * | 9/2005 | Houston et al. | 219/130.51 |
| 7,102,099 B2 * | 9/2006 | Huismann et al. | 219/130.51 |
| 7,304,269 B2 * | 12/2007 | Fulmer et al. | 219/130.51 |
| 7,705,270 B2 | 4/2010 | Norrish et al. | |
| 8,080,763 B2 * | 12/2011 | Fujiwara et al. | 219/130.51 |
| 8,203,099 B2 * | 6/2012 | Peters et al. | 219/130.51 |
| 8,373,093 B2 * | 2/2013 | Peters | 219/137 PS |
| 8,592,720 B2 * | 11/2013 | Nishisaka et al. | 219/130.1 |
| 8,604,387 B2 * | 12/2013 | Aimi et al. | 219/137 PS |
| 8,723,081 B2 * | 5/2014 | Hongu et al. | 219/130.51 |
| 8,759,715 B2 * | 6/2014 | Narayanan et al. | 219/130.51 |
| 2009/0152252 A1 | 6/2009 | Kawamoto et al. | |
| 2010/0176104 A1 * | 7/2010 | Peters et al. | 219/130.21 |

FOREIGN PATENT DOCUMENTS

| | | |
|---|---|---|
| CN | 102056699 A | 5/2011 |
| CN | 102139397 A | 8/2011 |
| EP | 1745880 A2 | 1/2007 |
| EP | 2251132 A1 | 11/2010 |
| JP | 1-150469 A | 6/1989 |
| JP | 2001-259838 A | 9/2001 |
| JP | 2009-285701 A | 12/2009 |

OTHER PUBLICATIONS

Chinese Patent Application No. 201280066440.6, Office Action, 20 pages, Feb. 16, 2015.

International Application No. PCT/IB2011/002532, International Search Report & Written Opinion, 18 pages, Sep. 12, 2012.

* cited by examiner

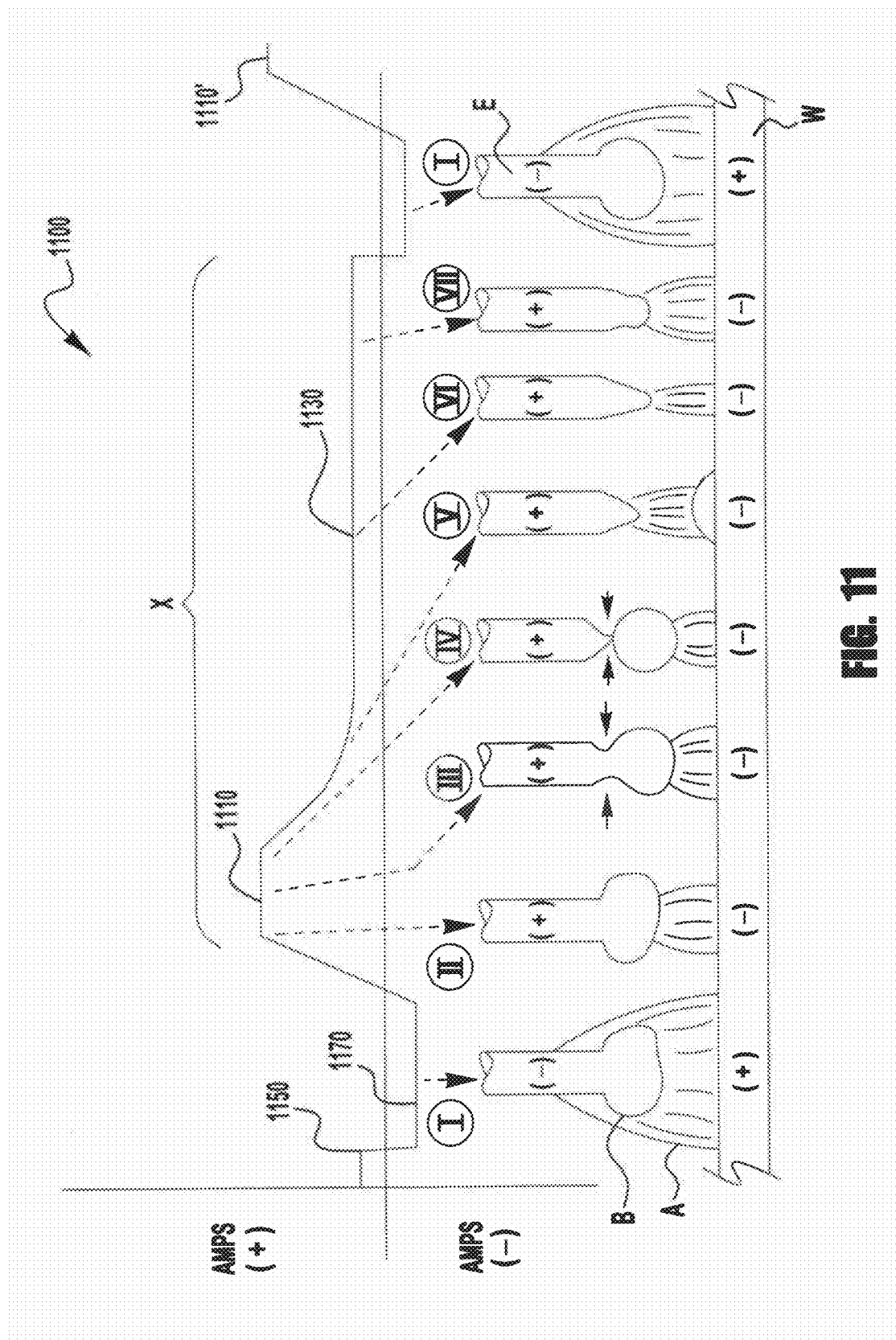

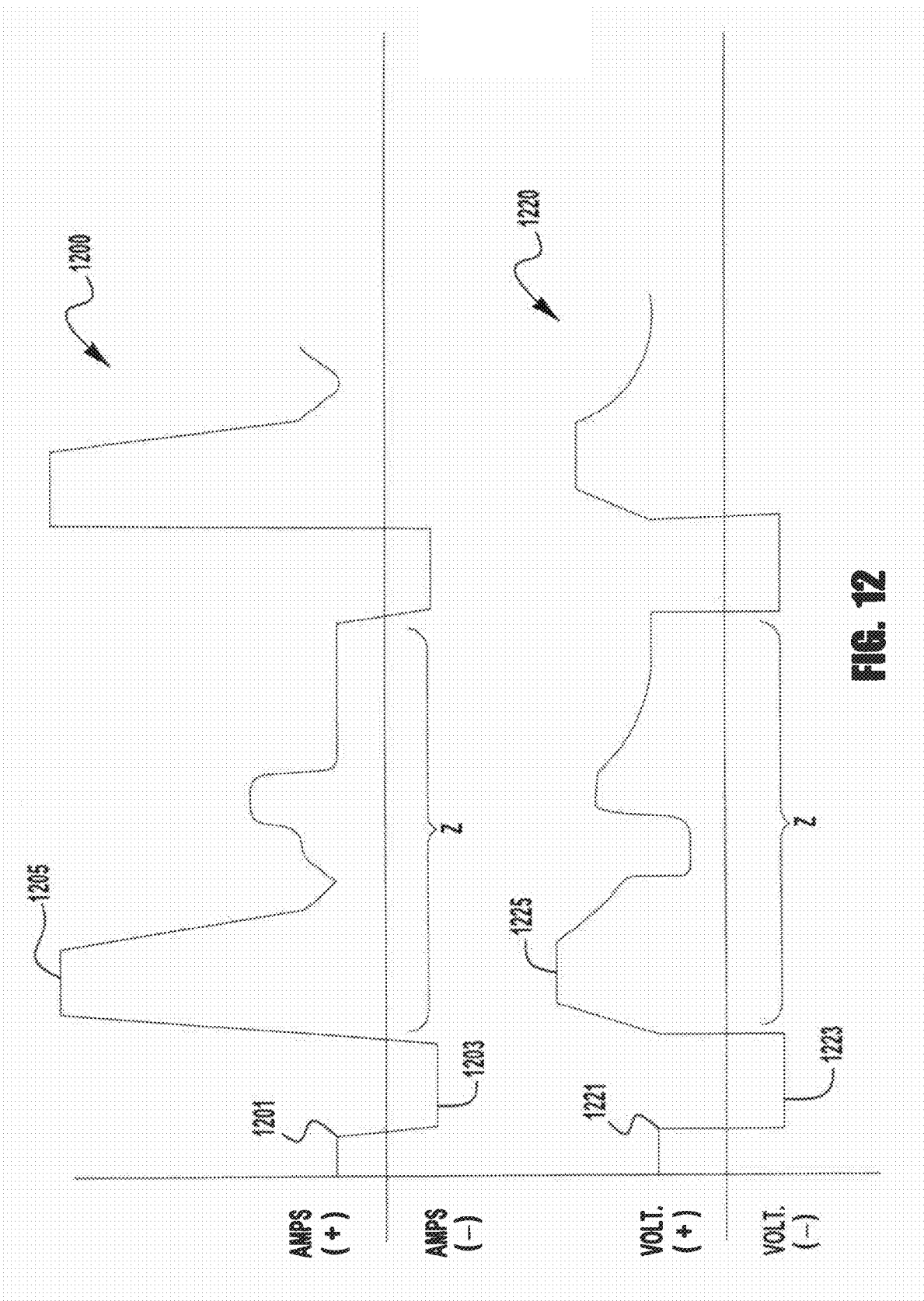

APPARATUS AND METHOD FOR PULSE WELDING WITH AC WAVEFORM

PRIORITY

This U.S. Patent Application is a continuation-in-part of, and claims priority to, U.S. patent application Ser. No. 13/267,153 filed on Oct. 6, 2011 entitled METHOD TO CONTROL AN ARC WELDING SYSTEM TO REDUCE SPATTER, which is incorporated herein by reference in its entirety, and which claims priority to U.S. Provisional Patent Application Ser. No. 61/405,895 filed on Oct. 22, 2010 and U.S. Provisional Patent Application Ser. No. 61/413,007 filed on Nov. 12, 2010, the disclosures of which are each incorporated by reference herein in their entirety.

BACKGROUND OF THE INVENTION

1. Field of the Invention

Devices, systems, and methods consistent with the invention relate to welding, and more specifically to devices, systems and methods for pulse welding with an AC waveform.

2. Incorporation by Reference

The present invention generally relates to improvement in spatter and heat input in welding systems of the general type described in each of U.S. Pat. Nos. 6,215,100 and 7,304,269, the entire disclosures of which are incorporated herein by reference in their entirety.

3. Description of the Related Art

In electric arc welding, a popular welding process is pulse welding which primarily uses a solid wire electrode with an outer shielding gas. MIG welding uses spaced pulses which first melt the end of an advancing wire electrode and then propels the molten metal from the end of the wire through the arc to the workpiece. A globular mass of molten metal is transferred during each pulse period of the pulse welding process. During certain pulse periods, especially in applications where the welding electrode operates very close to the workpiece, molten metal contacts the workpiece before being entirely released from the advancing wire electrode. This creates a short circuit (a.k.a., a short) between the advancing wire electrode and the workpiece. It is desirable to eliminate or clear the short rapidly to obtain the consistency associated with proper pulse welding. However, clearing a short can result in undesirable spatter being generated. Such spatter causes inefficiencies in the welding process and can result in molten metal being spattered over the workpiece which may have to be removed later using a grinding tool, for example.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a pulse welding apparatus which has a welding power converter which outputs a welding waveform having a plurality of welding cycles, where each of the cycles has first portion, a peak pulse portion and a background portion. The power converter provides the welding waveform to an electrode and at least one workpiece to weld the at least one workpiece. The welder also has an AC welding module which provides each of the peak pulse portion and the background portion to the workpiece with a first polarity and the first portion to the workpiece at a second polarity, which is opposite of the first polarity. In each of the welding cycles the first portion occurs prior to the peak pulse portion and after the background portion.

BRIEF DESCRIPTION OF THE DRAWINGS

The above and/or other aspects of the invention will be more apparent by describing in detail exemplary embodiments of the invention with reference to the accompanying drawings, in which:

FIG. 11 illustrates an example of a welding waveform which can be generated by the system in FIG. 10; and FIG. 12 illustrates an example of another welding waveform which can be generated by the system shown in FIG. 10.

DETAILED DESCRIPTION

Figure 1:
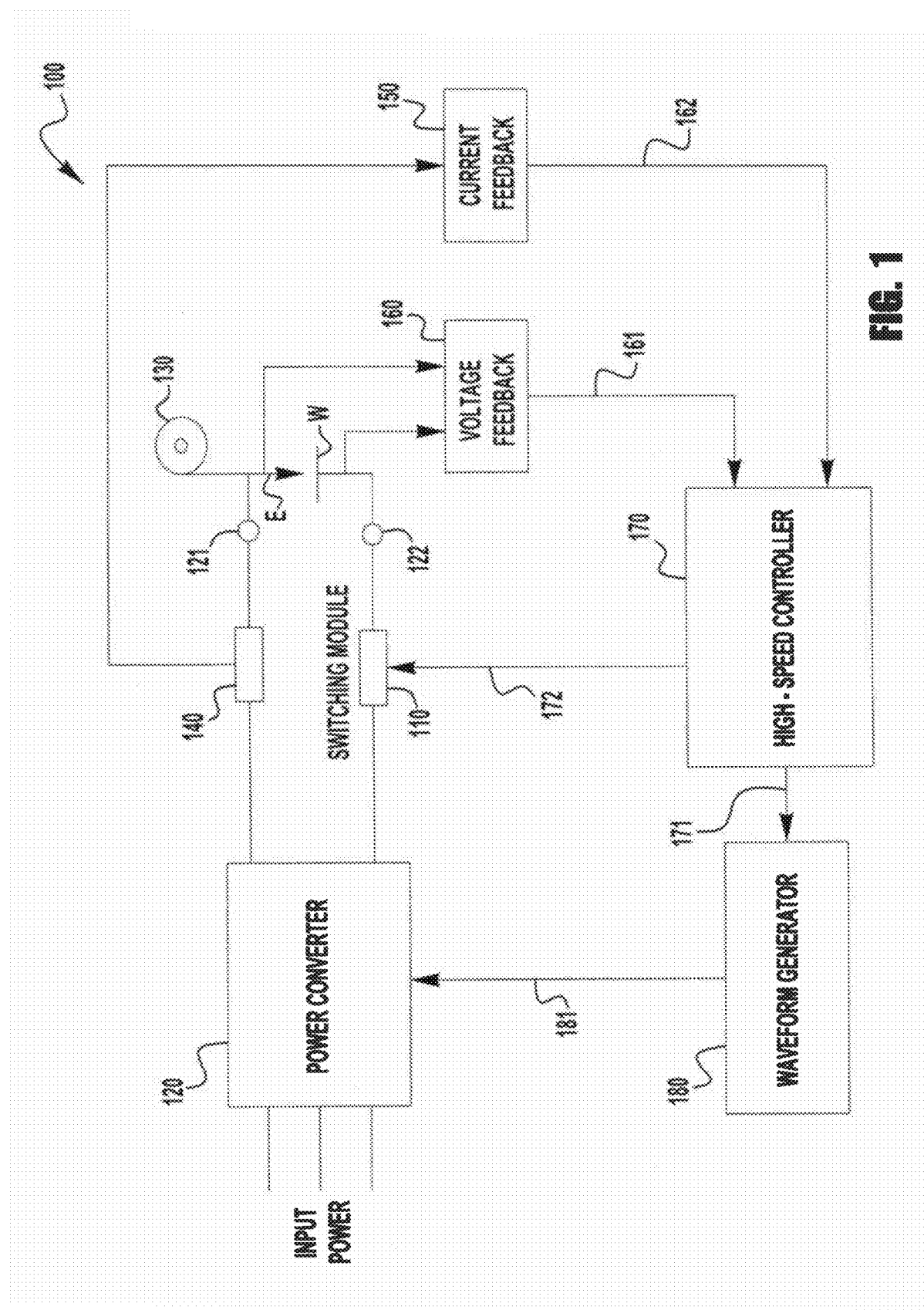
FIG. 1 illustrates a block diagram of an example embodiment of an electric arc welding system incorporating a switching module in a welding current return path.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

During an arc-welding process, when the distance between the tip of the electrode and the workpiece is relatively small, molten metal may be transferred via a contact transfer process (e.g., a surface-tension-transfer or STT process) or a free-flight transfer process (e.g., a pulsed welding process) with a tethered connection. In a contact transfer process, a molten metal ball on the tip of the welding electrode makes contact with the workpiece (i.e., shorts) and starts to "wet into" the molten puddle on the workpiece before the molten metal ball begins to substantially separate from the tip of the electrode.

Figure 6:
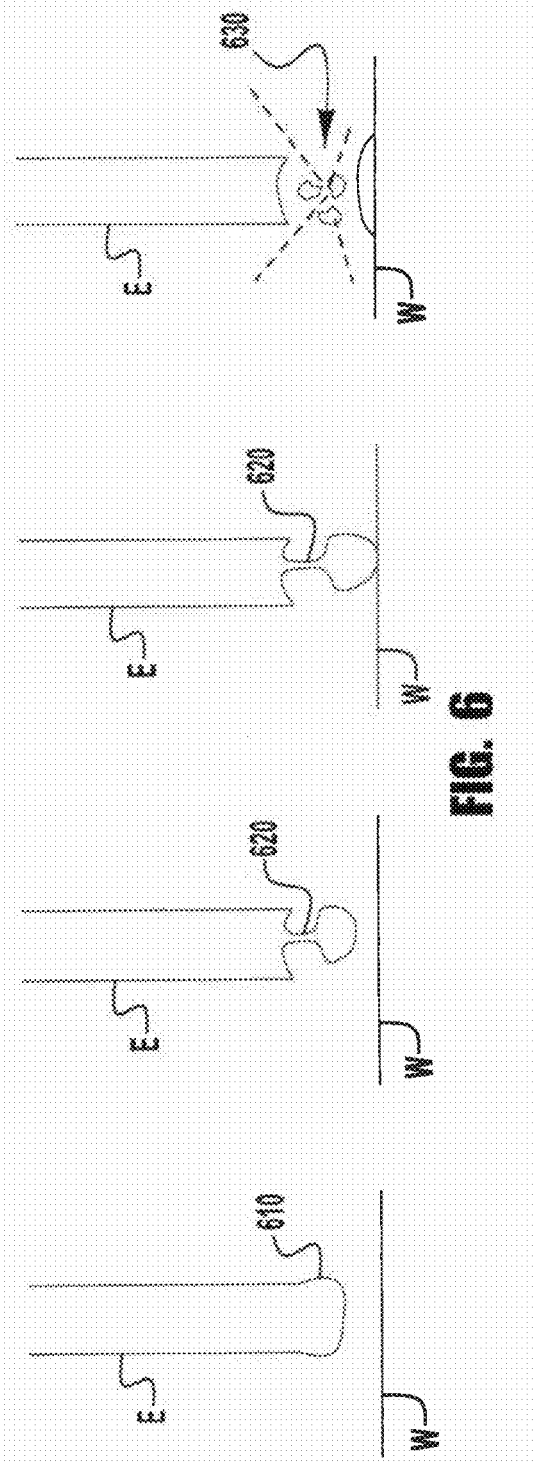
FIG. 6 illustrates the exploding spatter process discovered using high speed video technology in a free-flight transfer process having a tethered connection.

In a free-flight transfer process, the molten metal ball breaks free of the tip of the electrode and "flies" across the arc toward the workpiece. However, when the distance between the tip of the electrode and the workpiece is relatively short, the molten metal ball flying across the arc can make contact with the workpiece (i.e., short) while a thin tether of molten metal still connects the molten metal ball to the tip of the electrode. In such a tethered free-flight transfer scenario, the thin tether of molten metal tends to explode, causing spatter, when the molten metal ball makes contact with the workpiece as illustrated in FIG. 6 herein, due to a rapid increase in current through the tether.

FIG. 1 illustrates a block diagram of an example embodiment of an electric arc welding system 100 incorporating a switching module 110 in a welding output return path and providing welding outputs 121 and 122. The system 100 includes a power converter 120 capable of converting an input power to a welding output power. The power converter 120 may be an inverter-type power converter or a chopper-type power converter, for example. The system 100 further includes a wire feeder 130 capable of feeding a welding electrode wire E through, for example, a welding gun (not shown) that connects the welding electrode wire E to the welding output 121.

The system 100 also includes a current shunt 140 operatively connected between the power converter 120 and the welding output 121 for feeding welding output current to a current feedback sensor 150 of the system 100 to sense the welding output current produced by the power converter 120. The system 100 further includes a voltage feedback sensor 160 operatively connected between the welding output 121 and the welding output 122 for sensing the welding output voltage produced by the power converter 120. As an alternative, the switching module 110 could be incorporated in the outgoing welding current path, for example, between the power converter 120 and the current shunt 140, or between the current shunt 140 and the welding output 121.

The system 100 also includes a high-speed controller 170 operatively connected to the current feedback sensor 150 and the voltage feedback sensor 160 to receive sensed current and voltage in the form of signals 161 and 162 being representative of the welding output. The system 100 further includes a waveform generator 180 operatively connected to the high speed controller 170 to receive command signals 171 from the high speed controller 170 that tell the waveform generator how to adapt the welding waveform signal 181 in real time. The waveform generator 180 produces an output welding waveform signal 181 and the power converter 120 is operatively connected to the waveform generator 180 to receive the output welding waveform signal 181. The power converter 120 generates a modulated welding output (e.g., voltage and current) by converting an input power to a welding output power based on the output welding waveform signal 181.

The switching module 110 is operatively connected between the power converter 120 and the welding output 122 which is connected to the welding workpiece W during operation. The high speed controller 170 is also operatively connected to the switching module 110 to provide a switching command signal (or a blanking signal) 172 to the switching module 110. The high speed controller 170 may include logic circuitry, a programmable microprocessor, and computer memory, in accordance with an embodiment of the present invention.

In accordance with an embodiment of the present invention, the high-speed controller 170 may use the sensed voltage signal 161, the sensed current signal 162, or a combination of the two to determine when a short occurs between the advancing electrode E and the workpiece W, when a short is about to clear, and when the short has actually cleared, during each pulse period. Such schemes of determining when a short occurs and when the short clears are well known in the art, and are described, for example, in U.S. Pat. No. 7,304,269, which is incorporated herein by reference in its entirety. The high-speed controller 170 may command the waveform generator 180 to modify the waveform signal 181 when the short occurs and/or when the short is cleared. For example, when a short is determined to have been cleared, the high-speed controller 170 may command the waveform generator 180 to incorporate a plasma boost pulse (see pulse 750 of FIG. 7) in the waveform signal 181 to prevent another short from occurring immediately after the clearing of the previous short.

Figure 2:
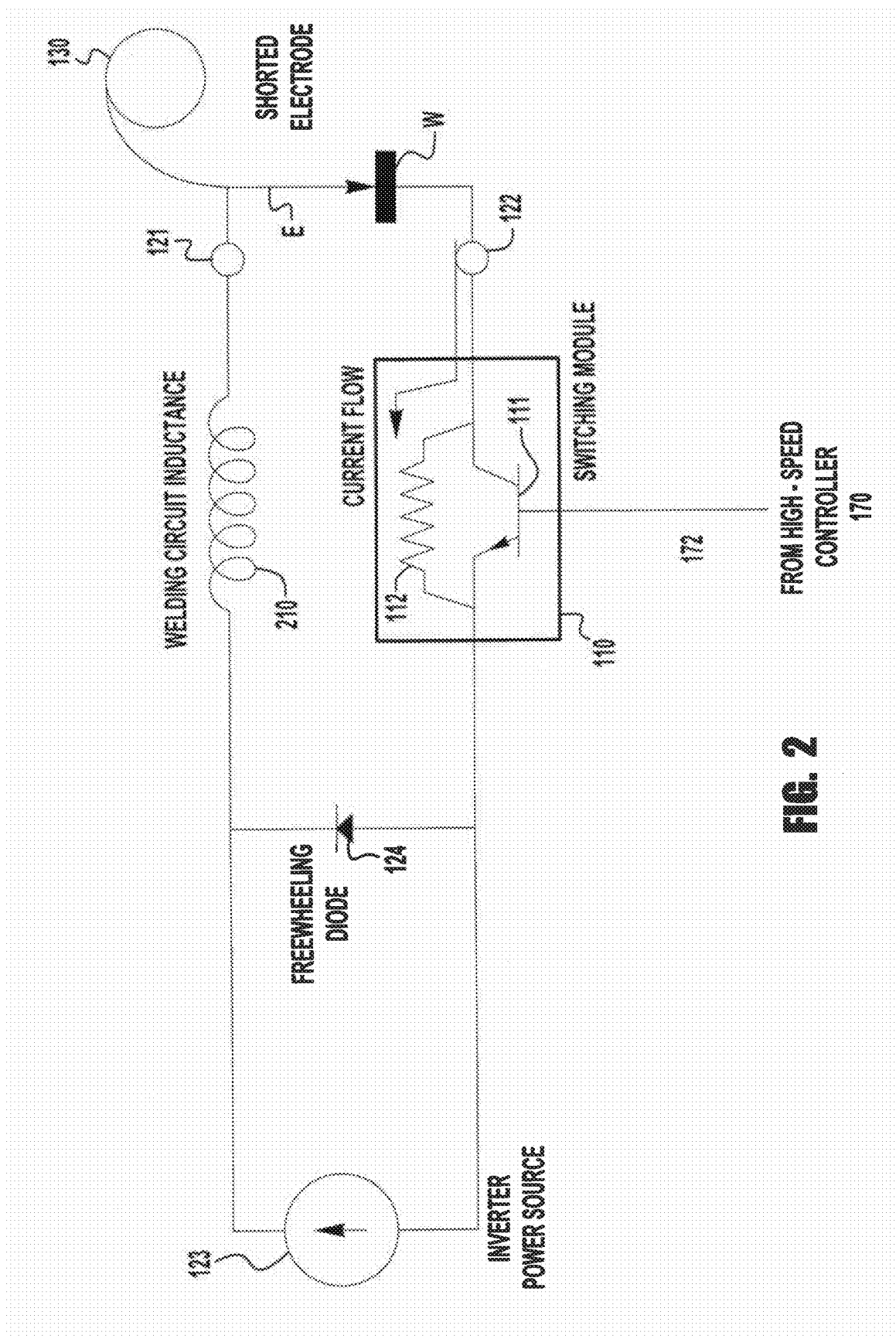
FIG. 2 illustrates a diagram of an example embodiment of a portion of the system of FIG. 1, including the switching module in the welding current return path.

FIG. 2 illustrates a diagram of an example embodiment of a portion of the system 100 of FIG. 1, including the switching module 110 in the welding current return path. The power converter 120 may include an inverter power source 123 and a freewheeling diode 124. The welding output path will have an inherent welding circuit inductance 210 due to the various electrical components within the welding output path. The switching module 110 is shown as having an electrical switch 111 (e.g., a power transistor circuit) in parallel with a resistive path 112 (e.g., a network of high power rated resistors).

During a pulse period of the welding waveform, when no short is present, the electrical switch 111 is commanded to be closed by the switching command signal 172 from the high speed controller 170. When the electrical switch 111 is closed, the electrical switch 111 provides a very low resistance path in the output welding return path, allowing welding current to freely return to the power converter 120 through the switch 111. The resistive path 112 is still present in the welding output return path, but most of the current will flow through the low resistance path provided by the closed switch 111. However, when a short is detected, the electrical switch 111 is commanded to be opened by the switching command signal 172 from the high-speed controller 170. When the electrical switch 111 is opened, current is cut off from flowing through the switch 111 and is forced to flow through the resistive path 112, resulting in the level of the current being reduced due to the resistance provided by the resistive path 112.

Figure 3:
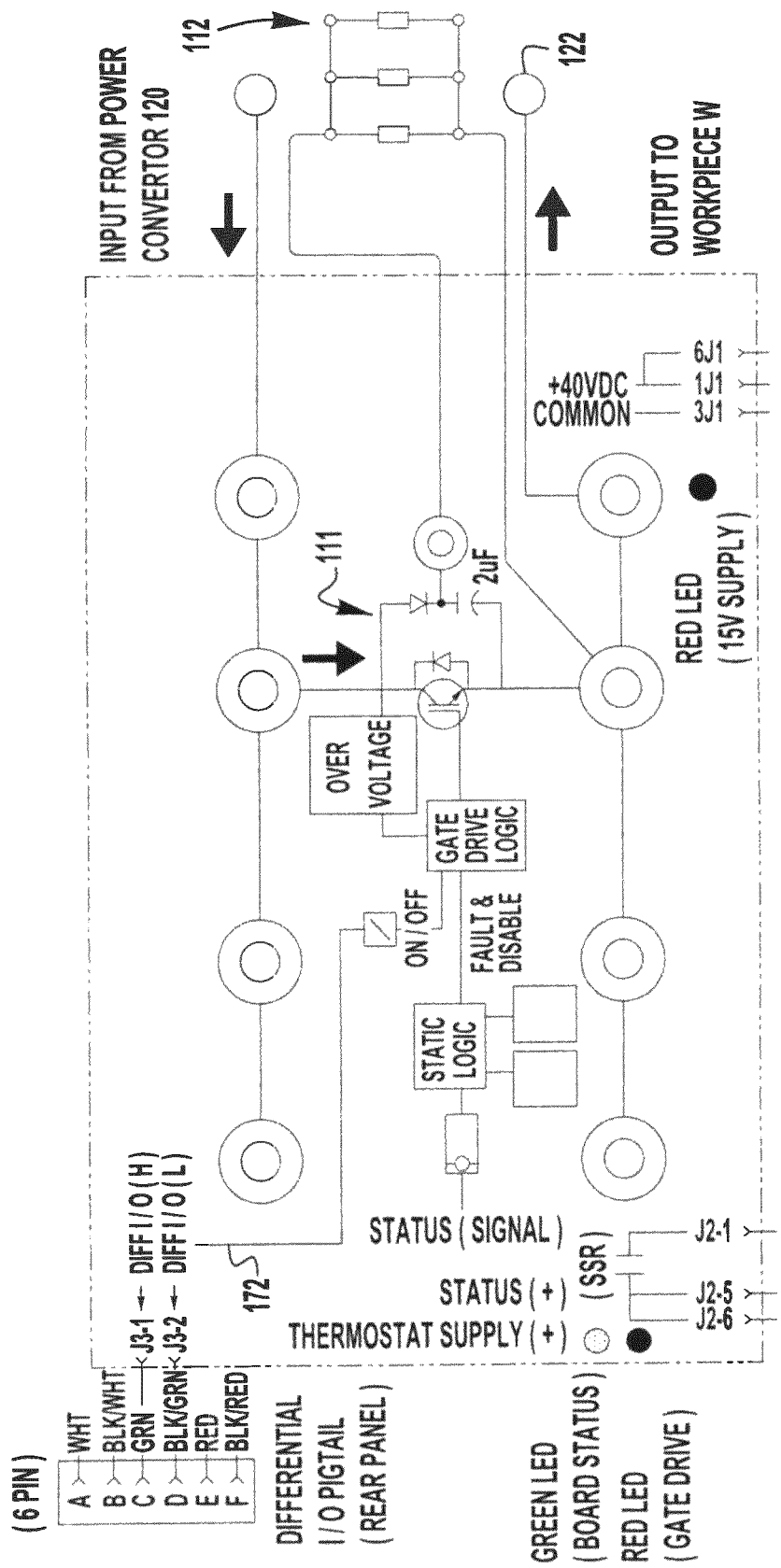
FIG. 3 illustrates a schematic diagram of an example embodiment of the switching module of FIG. 1 and FIG. 2.

FIG. 3 illustrates a schematic diagram of an example embodiment of the switching module 110 of FIG. 1 and FIG. 2. The switching module 110 includes the transistor circuit 111 and the resistor network 112 as shown. The switching module 110 may include a circuit board for mounting the various electrical components of the module 110 including the transistor circuit 111, the resistor network 112, LEDs, and status logic circuitry, for example.

Figure 4:
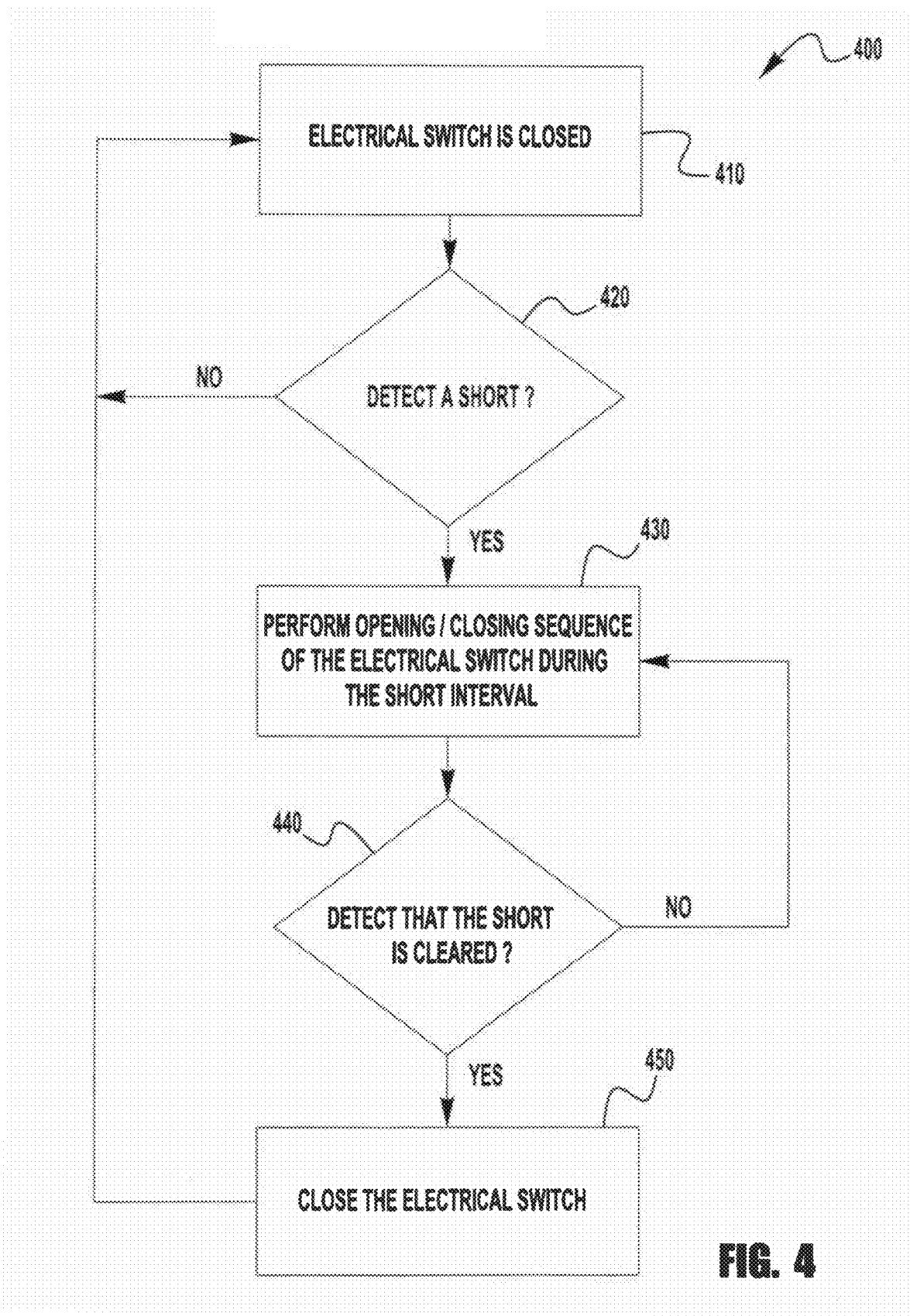
FIG. 4 illustrates a flowchart of a first example embodiment of a method for preventing spatter in a pulsed electric arc welding process using the system of FIG. 1.

FIG. 4 illustrates a flowchart of a first example embodiment of a method 400 for preventing spatter in a pulsed electric arc welding process using the system 100 of FIG. 1. Step 410 represents operation where the switch 111 of the switching module 110 is normally closed (no short condition). In step 420, if a short is not detected, then the switch 111 remains closed (no short condition). However, if a short is detected then, in step 430, the switch 111 is commanded to go through an opening and closing sequence during the short interval (i.e., the time period over which the electrode is shorted to the workpiece).

The opening/closing sequence in step 430 starts by opening the switch 111 when the short is first detected. The switch 111 remains open for a first period of time (e.g., a first 10% of the short interval). This decreases the output current quickly so the short does not break right away causing a large amount of spatter. After the first period of time, the switch is again closed and the output current is ramped during a second period of time to cause the molten short to begin to form a narrow neck in an attempt to break free from the electrode and clear the short. During this second period of time, as the current is ramping, a dv/dt detection scheme is performed to anticipate when the short will clear (i.e., when the neck will break). Such a dv/dt scheme is well known in the art. The switch 111 is then opened again just before the short is about to clear (e.g., during the last 10% of the short interval) in order to quickly lower the output current once again to prevent excessive spattering when the neck actually breaks (i.e., when the short actually clears).

In step 440, if the short (short between the electrode and the workpiece) is still present, then the switch 111 remains open. However, if the short has been cleared then, in step 450, the switch 111 is again closed. In this manner, during a short condition, the switch 111 goes through an opening/closing sequence and the current flowing through the welding output path is reduced when the switch is open, resulting in reduced spatter. The method 400 is implemented in the high-speed controller 170, in accordance with an embodiment of the present invention. Furthermore, in accordance with an embodiment of the present invention, the system 100 is able to react at a rate of 120 kHz (i.e., the switching module 110 can be switched on and off at this high rate), providing sufficient reaction to detection of a short and detection of the clearing of the short to implement the method 400 in an effective manner.

In accordance with a somewhat simpler alternative embodiment, instead of going through the opening/closing sequence described above with respect to FIG. 4, the current of the welding circuit path is decreased, in response to detection of a short between the advancing wire electrode and the workpiece, by opening the switch 111 for at least a determined period of time, thus increasing the resistance in the welding circuit path. For most pulse periods, the determined period of time is of a duration allowing for the short to clear without having to first increase the current of the welding circuit path. During a given pulse period, if the short clears before the determined period of time has expired as desired, then the process proceeds to the next part of the pulse period. However, if the short does not clear within the predetermined period of time then, immediately after the determined period of time, the switch 111 is closed again, causing the current of the welding circuit path to once again increase and clear the short. In such an alternative embodiment, the switch 111 is simply opened for at least part of the determined period of time in response to the detection of the short. In most pulse periods, the current does not have to be increased to clear the short.

Furthermore as an option, when the short between the advancing wire electrode and the workpiece is detected, a speed of the advancing wire electrode can be slowed. Slowing the speed of the advancing wire electrode helps to clear the short more readily by not adding as much material to the short as otherwise would be added. To slow the speed of the advancing wire electrode, a motor of a wire feeder advancing the wire electrode may be switched off and a brake may be applied to the motor. The brake may be a mechanical brake or an electrical brake, in accordance with various embodiments.

Figure 5:
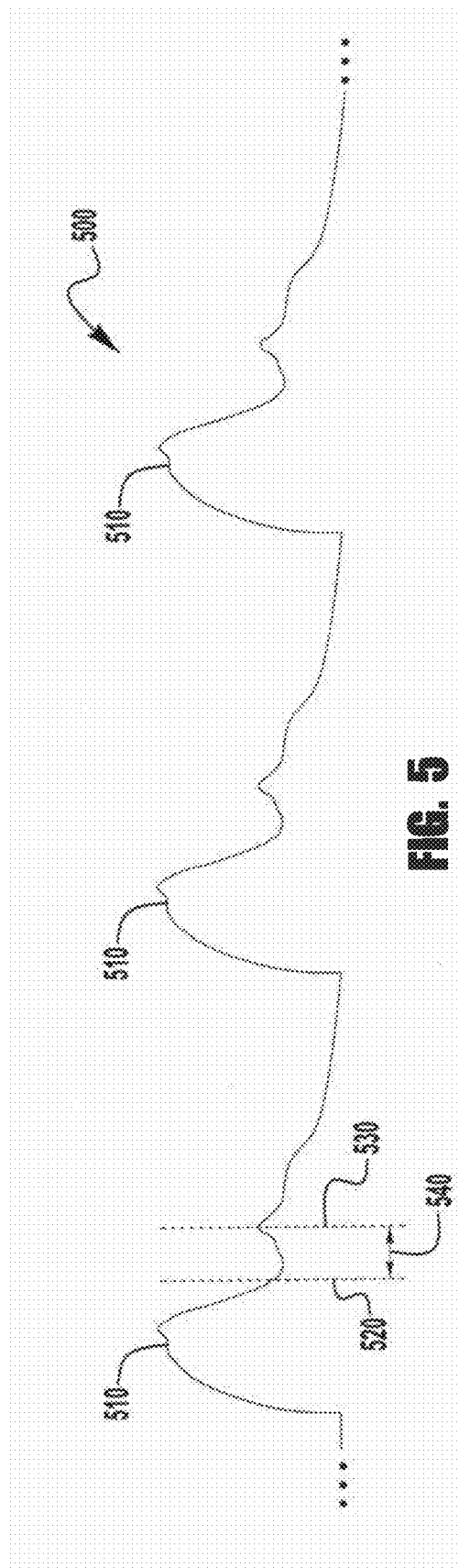
FIG. 5 illustrates an example of a conventional pulsed output current waveform resulting from a conventional pulsed electric arc welder that does not use the switching module of FIGS. 1-3 in accordance with the method of FIG. 4.

FIG. 5 illustrates an example of a conventional pulsed output current waveform 500 resulting from a conventional pulsed electric arc welder that does not use the switching module 110 of FIGS. 1-3 in accordance with the method 400 of FIG. 4, or the simpler alternative method described above. As can be seen from the waveform 500 of FIG. 5, after a peak pulse 510 is fired, a short may occur starting at time 520, for example, that lasts until time 530, for example when the short is cleared. The times 520 and 530 define a short interval 540. As can be seen in FIG. 5, peak pulses 510 are fired at regular intervals during the multiple pulse periods or cycles of the welding process. During any given cycle or pulse period, a short condition may or may not occur. In a conventional system, when a short occurs, there is very little resistance in the welding output path compared to the inductance. Current continues to flow even if the power source is turned off.

Referring again to FIG. 5, during the short interval 540, the output current tends to increase due to the lack of an arc between the electrode E and the workpiece W (the resistance becomes very low), and due to the fact that the welding circuit inductance 210 acts to keep current flowing in the welding output path, even when the power converter 120 is phased back to a minimum level. The current tends to increase until the short is cleared (i.e., until the molten metal short breaks free of the electrode E). However, at such increased current levels, when the short breaks or clears, the increased current levels tend to cause the molten metal to explode causing spatter.

FIG. 6 illustrates the exploding spatter process that was discovered using high speed video technology in a free-flight transfer process having a tethered connection. A high peak pulse (e.g., 510) causes a ball of molten metal 610 to push out towards the workpiece W creating a narrow tether 620 between the ball 610 and the electrode E. As the ball 610 flies toward the workpiece W across the arc, the tether 620 narrows and, eventually, a short occurs between the electrode E and the workpiece W through the tether 620. This condition tends to occur for almost every pulse period in an operation where the welding electrode operates very close to the workpiece. In particular, it was discovered that for a free-flight transfer pulse welding process, the tether 620 creates an incipient short and a large amount of current can begin to flow through the narrow tether 620. The increasing current level finally causes the relatively thin molten tether 620 to explode creating spatter 630 as shown in FIG. 6. However, by incorporating the switching module 110 and the method 400 (or the simpler alternative) as described above herein, the spatter 630 that is created can be greatly reduced.

Figure 7:
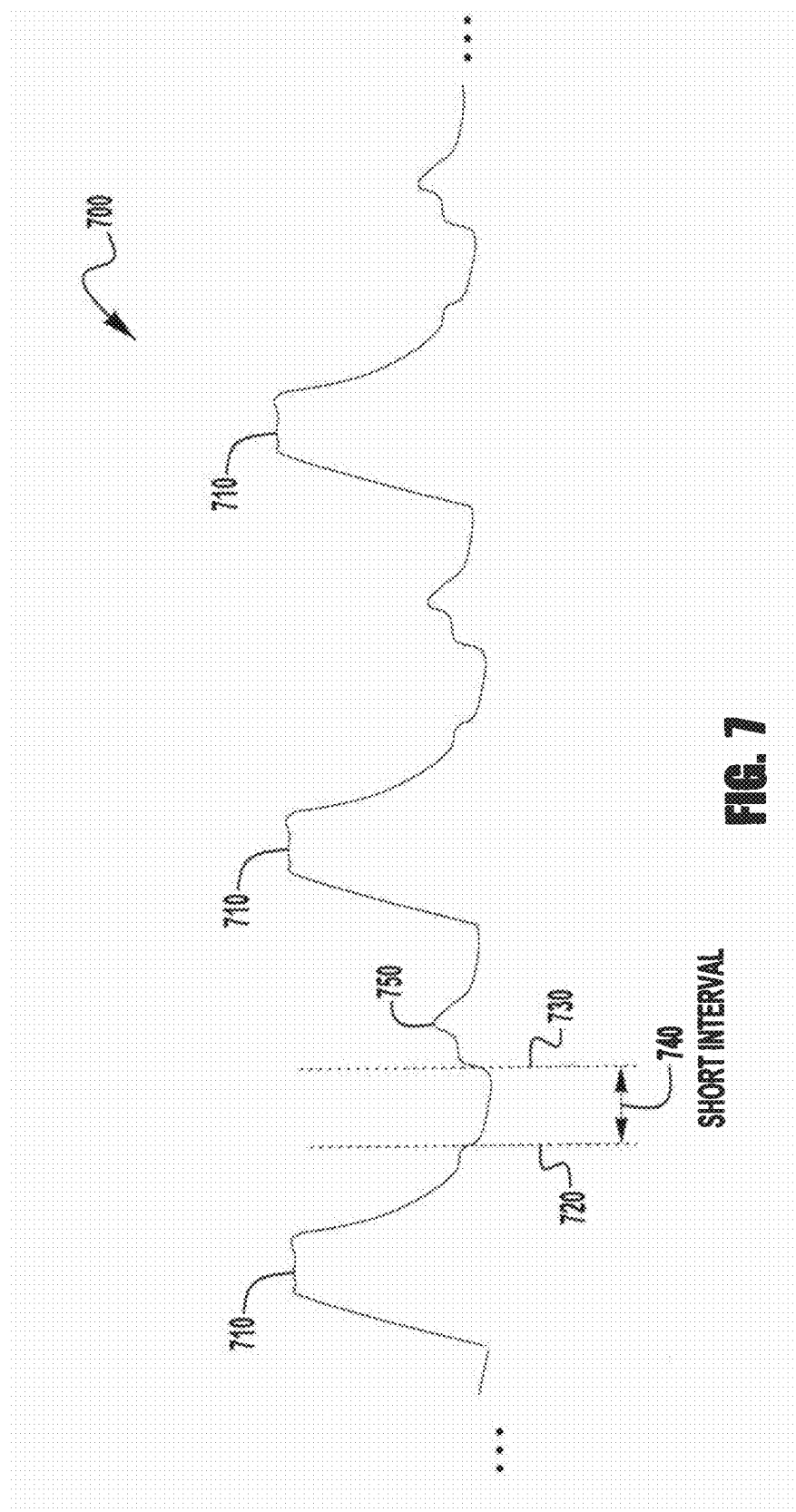
FIG. 7 illustrates an example of a pulsed output current waveform resulting from the pulsed electric arc welder of FIG. 1 that does use the switching module of FIGS. 1-3 in accordance with the method of FIG. 4.

FIG. 7 illustrates an example of a pulsed output current waveform 700 resulting from the pulsed electric arc welder 100 of FIG. 1 that uses the switching module 110 of FIGS. 1-3 in accordance with the method 400 of FIG. 4. As can be seen from the waveform 700 of FIG. 7, after a peak pulse 710 is fired, a short may occur starting at time 720, for example, that lasts until time 730, for example when the short is cleared. The times 720 and 730 define a short interval 740. As can be seen in FIG. 7, peak pulses 710 are fired at regular intervals during the multiple pulse periods or cycles of the welding process. During any given cycle, a short condition may or may not occur. However, when the distance between the tip of the electrode and the workpiece is relatively small, a short can occur on almost every cycle.

Referring again to FIG. 7, during the short interval 740, the switch 111 of the switching module 110 is opened when the short first occurs and again when the short is about to clear, causing the output current to flow through the resistive path 112 and, therefore, causing the current level to reduce. As an example, the switching signal 172 may be a logic signal that goes from high to low when a short is detected, causing the switch to open. Similarly, when the short is cleared, the switching signal 172 may go from low to high to close the switch 111 again. When the switch 111 is opened, the resistive path 112 puts a load on the welding output path allowing the freewheeling current to drop quickly to desired levels. The current tends to reduce until the short is cleared and, at such reduced current levels, when the short breaks or clears, the molten metal tends to pinch off in an unexplosive manner, eliminating or at least reducing the amount of spatter created. Also, in the waveform 700 of FIG. 7, the plasma boost pulse 750, which is used to help prevent another short from occurring immediately after the short that was just cleared, is more prominent and potentially more effective.

Figure 8:
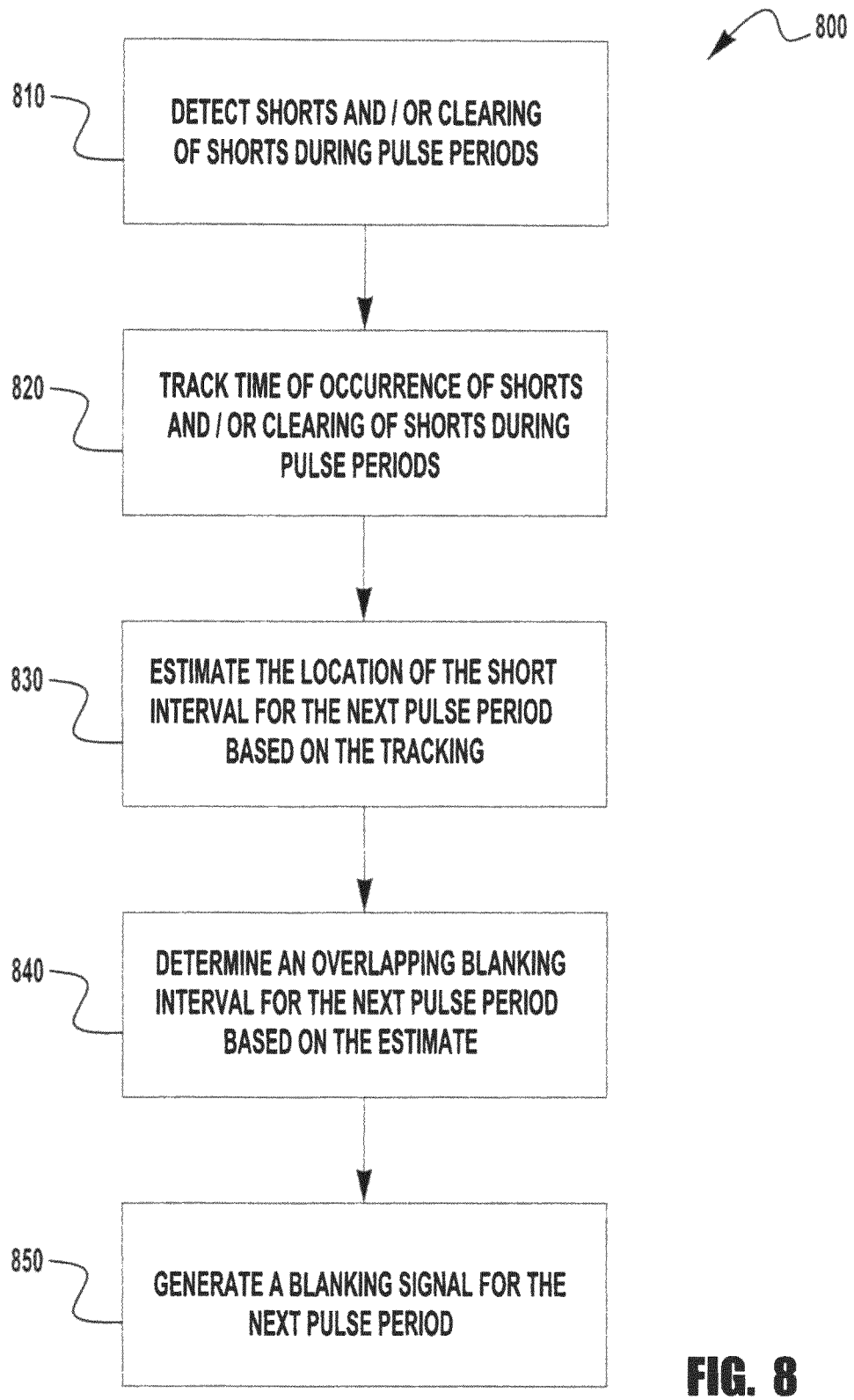
FIG. 8 illustrates a flowchart of another example embodiment of a method for preventing spatter in a pulsed electric arc welding process using the system of FIG. 1.

FIG. 8 illustrates a flowchart of another example embodiment of a method 800 for preventing spatter in a pulsed electric arc welding process using the system 100 of FIG. 1. In accordance with an embodiment, the method 800 is performed by the controller 170. The high speed controller 170 tracks the times of occurrence of the shorts and/or the clearing of the shorts and provides an estimate of when the short interval 940 (the time between the occurrence of a short and when the short is cleared) (see FIG. 9) will occur during at least the next pulse period. From this estimate, a blanking interval 960 (see FIG. 9) can be determined which is used to generate the blanking signal 172.

In step 810 of the method 800, the system 100 detects the occurrence of shorts and/or the clearing of those shorts during the repeating pulse periods of the pulsed welding waveform, according to known techniques. In step 820, the time of occurrence of the detected shorts and/or clearings within the pulse periods are tracked (e.g., by the high-speed controller 170). In step 830, the location and duration of the short interval 940 (see FIG. 9) for a next pulse period is estimated based on the tracking results. In step 840, an overlapping blanking interval 960 for at least the next pulse period is determined based on the estimated location of the short interval for the next pulse period. In step 850, a blanking signal (a type of switching signal) 172 is generated (e.g., by the controller 170) to be applied to the switching module 110 during the next pulse period.

Figure 9:
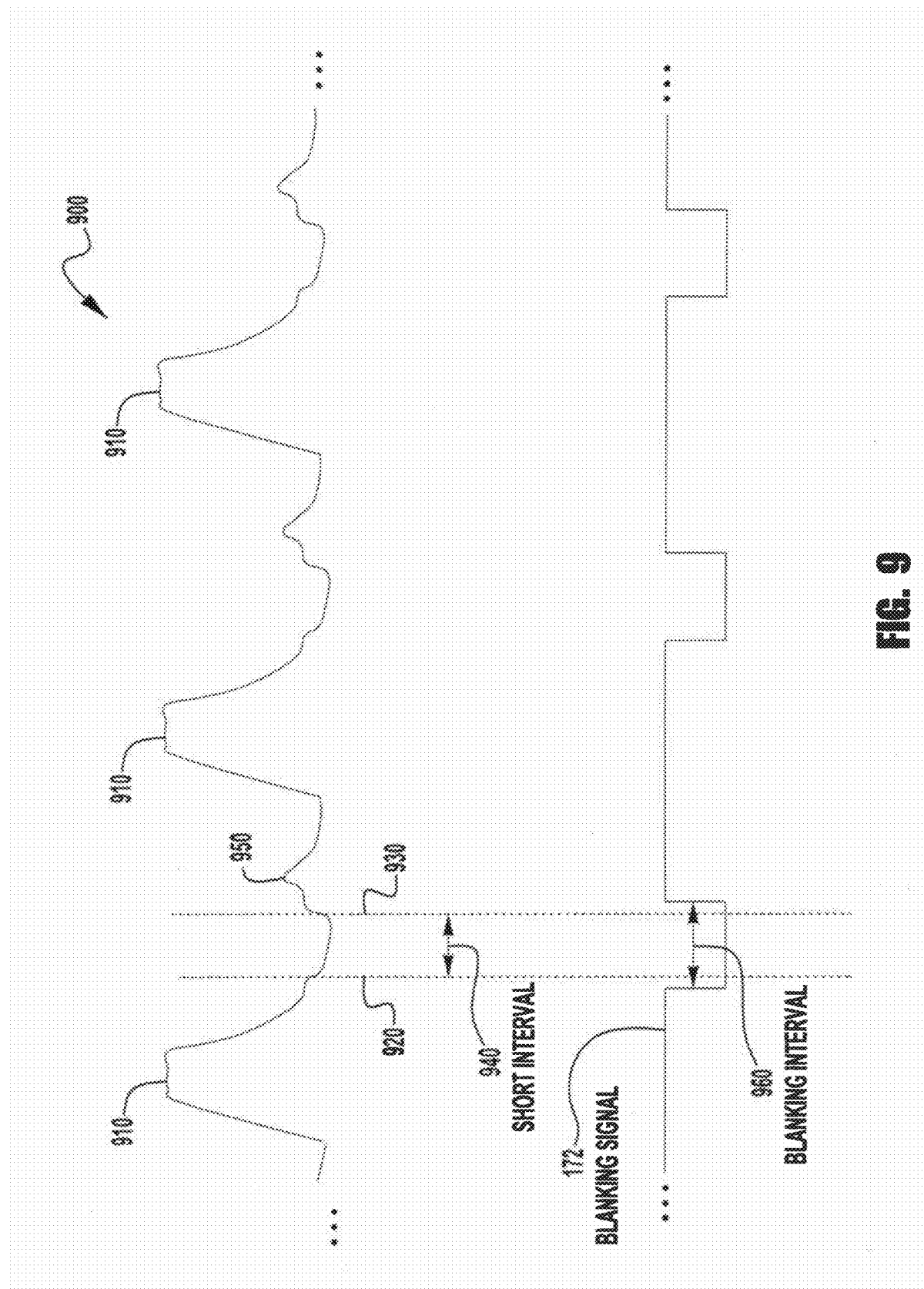
FIG. 9 illustrates an example of a pulsed output current waveform resulting from the pulsed electric arc welder of FIG. 1 that uses the switching module of FIGS. 1-3 in accordance with the method of FIG. 8.

FIG. 9 illustrates an example of a pulsed output current waveform 900 resulting from the pulsed electric arc welder 100 of FIG. 1 that uses the switching module 110 of FIGS. 1-3 in accordance with the method 800 of FIG. 8. As can be seen from the waveform 900 of FIG. 9, after a peak pulse 910 is fired, a short may occur starting at time 920, for example, that lasts until time 930, for example when the short is cleared. The times 920 and 930 define a short interval 940. As can be seen in FIG. 9, peak pulses 910 are fired at regular intervals during the welding process. During any given cycle, a short condition may or may not occur. However, during a welding process where the arc length is relatively short (i.e., where the wire electrode is operated relatively close to the workpiece), shorts can occur in almost every pulse period.

In accordance with the method 800, the times of occurrence of the short and/or clearing of the short within the pulse period are determined and tracked from pulse period to pulse period. In this manner, the controller 170 may estimate the location of the short interval that will likely occur in the next or upcoming pulse periods. However, at the beginning of a pulsed welding process, before any substantial tracking information is available, the location of the short interval may be a stored default location based on, for example, experimental data or stored data from a previous welding process. The blanking signal 172 can be adapted or modified to form a blanking interval 960 within the blanking signal 172 which temporally overlaps the estimated short interval 940 for the next pulse period(s). Ideally, the blanking interval 960 starts shortly before the short interval 940 of the next pulse period (e.g., before the time 920) and ends shortly after the short interval 940 of the next pulse period (e.g., after the time 930), thus the temporal overlap. In one embodiment, only the times of occurrence of a short are tracked, not the clearing of the shorts. In such an embodiment, the duration of the blanking interval is set to last long enough for the short to clear, based on experimental knowledge.

In this manner, the actual occurrence of a short during the next pulse period does not have to be detected before the switch 111 of the switching module 110 can be opened. As the pulsed welding process progresses, the location of the short interval may drift or change as the distance between the wire electrode and the workpiece drifts or changes, for example. However, in this embodiment, since the location of the short interval is being tracked over time, the location of the blanking signal can be adapted to effectively follow and anticipate the short interval. By opening the switch 111 during the blanking interval 960, the current drops and it is expected that the tether will occur and break during the blanking interval 960.

Experimental results have shown that, using the switching module 110 as described herein in a particular pulsed welding scenario, the welding output current level at the point of clearing the short can be reduced from about 280 amps to about 40 amps, making a tremendous difference in the amount of spatter produced. In general, reducing the current below 50 amps seems to significantly reduce spatter. In addition, travel speeds (e.g., 60-80 inches/minute) and deposition rates are able to be maintained.

Other means and methods of reducing the welding output current level during the time period when a short is present between a welding electrode and a workpiece are possible as well. For example, in an alternative embodiment, the control topology of a welding power source may be configured to control the output current to a highly regulated level during the time of the short. The power source can control the shorting current to a lower level (e.g., below 50 amps) during a shorting interval to reduce the spatter. For example, referring to FIG. 1, the switching module 110 can be disabled or eliminated, allowing current to freely flow in the welding output circuit path. The controller 170 is configured to command the waveform generator 180 to modify a portion of the output welding waveform signal 181 of the welding process during the blanking interval to reduce the welding output current through the welding output circuit path. Therefore, in this alternative embodiment, the controller 170 reduces the current during the blanking interval through the waveform generator 180 and the power converter 120, instead of via the switching module 110. Such an alternative embodiment can work quite well if the inductance 210 of the welding circuit is sufficiently low.

In summary, an electric arc welder and a method for performing a pulse welding process producing reduced spatter are disclosed. The welder produces a current between an advancing electrode and a workpiece. The welder includes a short-detecting capability for detecting a short condition upon occurrence of a short circuit between the advancing electrode and the workpiece. The welder is controlled to reduce the current between the advancing electrode and the workpiece during the time of the short to reduce spatter of molten metal when the short clears.

An embodiment of the present invention comprises a method for reducing spatter in a pulsed arc-welding process. The method includes tracking times of occurrence of short intervals during pulse periods of a pulsed arc-welding process using a controller of a welding system. The tracking may be based on at least one of detecting occurrences of shorts during pulse periods of the pulsed welding process and detecting clearing of shorts during pulse periods of the pulsed welding process. The method further includes estimating a temporal location of a short interval for at least a next pulse period of the pulse welding process based on the tracking. The method also includes determining a blanking interval for at least a next pulse period based on the estimating. The method may further include generating a blanking signal for at least a next pulse period based on the blanking interval. The method may further include increasing a resistance of a welding circuit path of the welding system during the blanking interval in response to the blanking signal to reduce a welding current through the welding circuit path during the blanking interval. Increasing the resistance may include opening an electrical switch of a switching module disposed in the welding circuit path. In accordance with an embodiment, the electrical switch is in parallel with a resistive path within the switching module. The method may include reducing a welding current through a welding circuit path of the welding system during the blanking interval for at least a next pulse period by modifying a portion of a waveform of the welding process during the blanking interval, wherein the waveform is generated by a waveform generator of the welding system. In accordance with an embodiment, the blanking interval is temporally wider than and temporally overlaps an expected short interval of at least a next pulsed period.

An embodiment of the present invention comprises a system for reducing spatter in a pulsed arc-welding process. The system includes a controller configured for tracking times of occurrence of short intervals during pulse periods of a pulsed arc-welding process of a welding system. The controller is further configured for estimating a temporal location of a short interval for at least a next pulse period of the pulsed welding process based on the tracking. The controller is also configured for determining a blanking interval for at least a next pulse period based on the estimating. The controller may also be configured for generating a blanking signal for at least a next pulse period based on the blanking interval. In accordance with an embodiment, the blanking interval is temporally wider than and temporally overlaps an expected short interval of at least a next pulse period. The system may further include a switching module disposed in a welding circuit path of the welding system and operatively connected to the controller. The switching module is configured to increase a resistance of the welding circuit path of the welding system during the blanking interval in response to the blanking signal to reduce a welding current through the welding circuit path during the blanking interval. The switching module includes an electrical switch and a resistive path in parallel. The controller may be configured for commanding a waveform generator of the welding system to reduce a welding current through a welding circuit path of the welding system during the blanking interval for at least a next pulse period by modifying a portion of a waveform of the welding process during the blanking interval. The controller may further be configured to detect occurrences of shorts during pulse periods of the pulsed welding process, and to detect occurrences of clearing of shorts during pulse periods of the pulsed welding process.

An embodiment of the present invention comprises a method for reducing spatter in a pulsed arc-welding process. The method includes detecting a short during a pulse period of a pulsed arc-welding process using a controller of a welding system. The method further includes increasing a resistance of a welding circuit path of the welding system for a first period of time to reduce a welding current through the welding circuit path in response to detecting the short. The method also includes decreasing the resistance of the welding circuit path of the welding system for a second period of time immediately after the first period of time to increase the welding current through the welding circuit path. The method further includes increasing the resistance of the welding circuit path of the welding system for a third period of time immediately after the second period of time to reduce the welding current through the welding circuit path in anticipation of clearing the short. Increasing the resistance may include opening an electrical switch of a switching module disposed in the welding circuit path. Decreasing the resistance may include closing an electrical switch of a switching module disposed in the welding circuit path. The method may further include detecting that a short has cleared, and decreasing the resistance of the welding circuit path of the welding system in response to detecting that the short has cleared.

An embodiment of the present invention comprises a method for reducing spatter in a pulsed arc-welding process. The method includes detecting a short between a workpiece and an advancing wire electrode during a pulse period of a pulsed arc-welding process using a controller of a welding system. The method further includes decreasing a current of a welding circuit path of the welding system for at least a portion of a determined period of time in response to detecting the short wherein, during most pulse periods of the pulsed arc-welding process, the determined period of time is of a duration allowing for the short to clear without having to first increase the current of the welding circuit path. Decreasing the current may include increasing a resistance of the welding circuit path. Increasing the resistance may include opening an electrical switch of a switching module disposed in the welding circuit path, wherein the switching module includes the electrical switch in parallel with a resistance path. The method may further include increasing the current of the welding circuit path of the welding system immediately after the determined period of time if the short has not cleared. Increasing the current may include decreasing a resistance of the welding circuit path. Decreasing the resistance may include closing an electrical switch of a switching module disposed in the welding circuit path, wherein the switching module includes the electrical switch in parallel with a resistance path. The method may further include slowing down a speed of the advancing wire electrode in response to detecting the short between the electrode and the workpiece. Slowing down the speed of the advancing wire electrode may include switching off a motor of a wire feeder advancing the wire electrode and applying a brake to the motor. The brake may be a mechanical brake or an electrical brake, in accordance with various embodiments.

Figure 10:
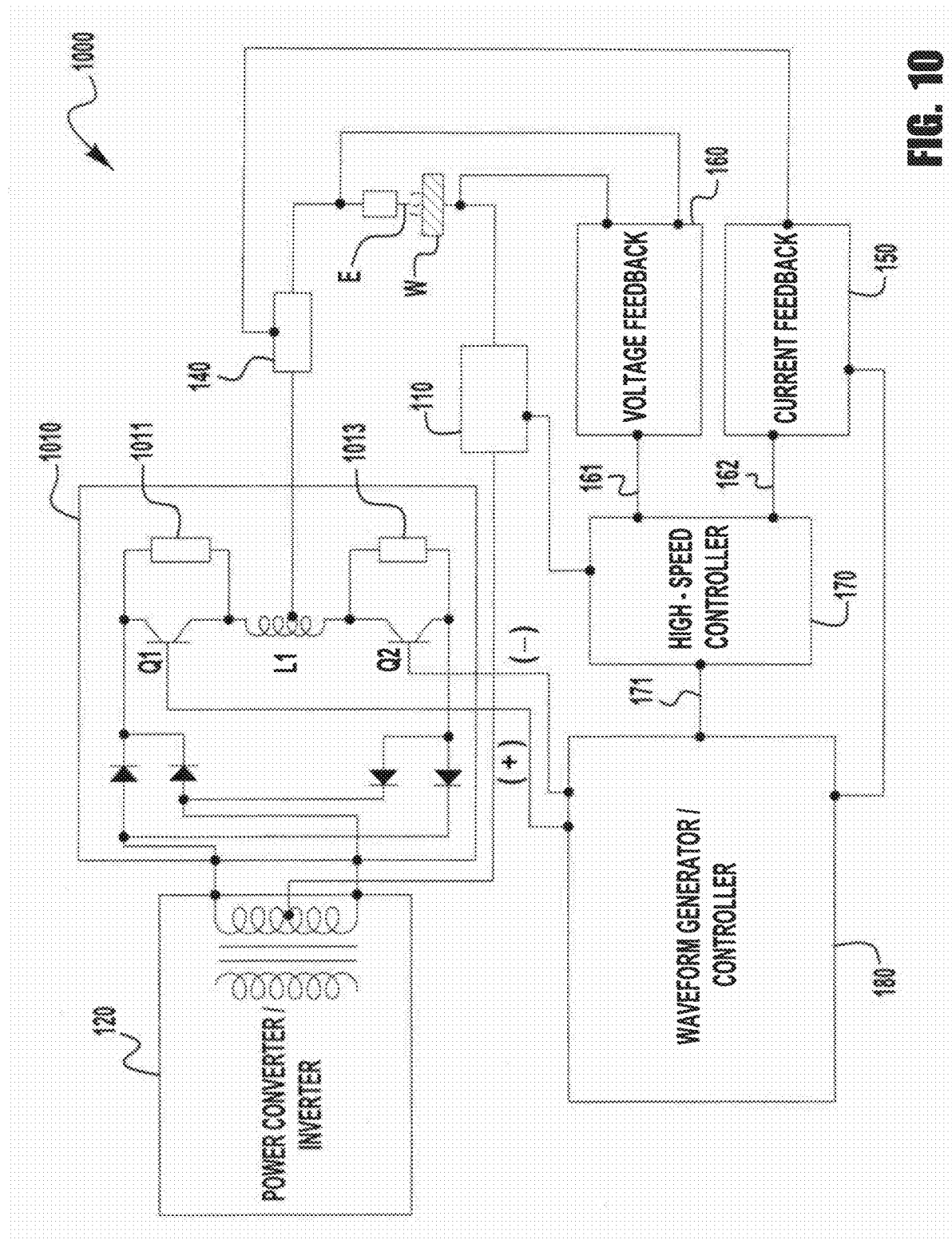
FIG. 10 illustrates an example of an additional welding system in accordance with an additional exemplary embodiment of the present invention which is capable of performing AC welding.

FIGS. 10-12 depict a further apparatus and method for pulse welding to achieve improved performance, spatter control and heat input. Specifically, the embodiments shown in FIGS. 10-12 utilize an AC welding waveform, which will be described in more detail below.

FIG. 10 depicts an exemplary embodiment of a welding system 1000 which is similar in construction and operation of the systems 100 described herein in that the system 1000 is capable of using pulse welding (including the embodiments discussed herein) to weld a workpiece W. The system 1000 has similar components as discussed above including the waveform generator 180, power converter/inverter 120, shunt 140, switching module 110, high speed controller 170, voltage feedback 160, current feedback 150, etc. However, this exemplary embodiment also utilizes an AC welding module 1010. The module 1010 is constructed and configured to be able to provide an AC welding signal to the workpiece during welding. In the system 1000 shown in FIG. 10 the module 1010 is shown as a separate component from the power converter/inverter 120 and can, in fact, be a separate module which is coupled to a power supply external to a housing of the power converter/inverter 120. However, in other exemplary embodiments the module 1010 can be made integral with the power converter/inverter 120 such that they are within a single housing. As with the embodiments described above, the power converter/inverter 120 can be any type of known power supply module used for welding applications which is capable of output a welding signal, and as shown can include at least one transformer. The configuration of the AC welding module 1010 as shown in FIG. 10 is intended to be exemplary and embodiments of the present invention are not limited to using the shown configuration, but other circuits can be used to provide an AC welding signal as described below. The module 1010 shown in FIG. 10 is similar in construction to the AC welding circuit described in U.S. Pat. No. 6,215,100 which is incorporated herein by reference in its entirety, and more specifically as described in relation to FIG. 4 of the incorporated patent. Because the operation and construction of this circuit is discussed in detail in the incorporated patent that discussion will not be repeated herein, as it is incorporated by reference. However, for the sake of clarity the waveform generator/controller 180 as shown in FIG. 10 can embody the controller 220 shown in FIG. 4 of the U.S. Pat. No. 6,215,100. Furthermore, even though the high-speed controller 170 is shown as a separate module than the controller 180, in other embodiments the high-speed controller 170 can be made integral with the controller 180. Also, as shown in FIG. 10, in some embodiments the current feedback 150 can be coupled directly to the controller 180 so that this feedback can be used by the controller 180 for the control of the module 1010, as generally described in the U.S. Pat. No. 6,215,100.

In some exemplary embodiments of the present invention, the switching module 110 may not be present in embodiments utilizing an AC module 1010. This because the switches Q1 and Q2 can be utilized in a similar fashion as the switching module 110 described above. That is the switches Q1 and/or Q2 can be controlled in a similar way, during a constant polarity portion of the waveform, such that the switching module 110 is not utilized.

As shown in FIG. 10, the module 1010 has two switches Q1 and Q2 which are used to control current flow through the inductor L1 such that the flow of current through the electrode E and work piece W can be controlled in such a way that the polarity of the signal can be reversed during welding. Specifically, the flow of current can be controlled by the switches Q1 and Q2 such that the electrode E is positive during some of the welding waveform and then switched to being negative for the remainder of the waveform. When the switch Q1 is closed and the switch Q2 is open the current flow is such that the electrode E has a positive polarity, and when the switch Q2 is closed and the switch Q1 is open the electrode E has a negative polarity. The snubbers 1011 and 1013 are used in a similar fashion to the resister 112 described above, and can be used to implement an STT type circuit control.

Other AC welding power supplies and AC welding circuits can be employed without departing from the spirit and scope of the present invention.

As shown in FIGS. 5, 7 and 9 of the present application, pulse welding can be performed when the entire weld form has one polarity (typically positive). This means that the current flow in a single direction throughout the welding process. In some welding applications this unidirectional flow can be disadvantageous. This is especially true when the electrode has positive polarity because with such a flow the welding arc is usually focused between the leading end of the electrode and the workpiece W. Generally, this is desirable but can also tend to require an increased amount of energy to initial ball formation at the end of the electrode before droplet transfer occurs in a welding operation.

FIG. 11 depicts an exemplary welding waveform 1100 in accordance with an exemplary embodiment of the present invention. Specifically, FIG. 11 shows a single welding cycle of a waveform 1100, where the waveform cycle has an opposite polarity portion 1150, a peak pulse portion 1110 and a background portion 1130. In the embodiment shown, the peak pulse portion 1110 is the portion of the waveform cycle having the maximum current level for the waveform cycle, and typically represents the droplet transfer portion of the waveform. In known pulse welding waveforms the peak portion 1110 and the background portion 1130 (shown together as X) where typically employed such that a subsequent peak pulse portion 1110' directly followed the preceding background portion 1130. In such embodiments the background portion 1130 was used to begin the melting of the electrode E to begin the formation of a ball, prior to the peak portion 1110. A representation of this melting can be seen in FIG. 7 of U.S. Pat. No. 7,304,269 at roman numeral I. As shown, the end of the electrode E is starting to form a ball, but the formation is relatively small. However, such relatively small amount of initial melting can be disadvantageous in some welding applications. Furthermore, the increase of current (to increase melting) before the peak pulse portion 1110 may not be desirable because of the required additional energy and heat input into the workpiece W during welding. Thus, embodiments of the present invention employ current pulse having an opposite polarity of the peak pulse portion 1110 and the background 1130.

As shown in FIG. 11, a current pulse 1150 having an opposite polarity is employed immediately prior to the peak pulse portion 1110. As shown at I, because the flow of current is in the opposite direction the arc A has a different shape or profile than that in the other polarity. Specifically, with a negative polarity the current creates an arc A which envelopes more of the electrode E, rather than being focused out of the end of the electrode E. Stated differently, the arc A is much broader at the work piece W and extends along a length of the electrode E. By extending the arc A up the electrode E more surface area of the electrode E is heated and thus more heat is input into the electrode, without increasing the current. Because of this the melting of the end of the electrode E is increased and a much larger molten ball B is created at the end of the electrode E. Further, this larger ball B is created without an increase in energy usage by the welding power supply. Thus, embodiments of the present invention use less energy per droplet transfer than known systems. As shown, following the opposite polarity pulse 1150 the peak pulse portion 1110 is immediately implemented. The affect of the pulse peak portion 1110 and background portion 1130 is shown in roman numerals II through VII, after which the opposite polarity portion 1150 is repeated prior to the next pulse cycle. As a reference, roman numerals III and IV depict the pinch force acting on the electrode E during droplet transfer. Therefore, embodiments of the present invention are able to decrease the amount of energy needed to transfer a droplet and/or increase an amount of consumable transferred per pulse cycle.

In embodiments of the present invention the peak current 1170 of the opposite polarity portion 1150 has the same magnitude as the background portion 1130, but it has an opposite polarity. However, in other exemplary embodiments of the present invention, the peak current 1170 of the opposite polarity portion 1150 has a current level which is different than that of the background level 1130. For example, when welding out-of-position, such as in a vertical-up welding position, the opposite polarity peak 1170 will have a current magnitude which is larger than that of the background portion 1130. In exemplary embodiments of the present invention, the opposite polarity portion 1150 has a peak current 1170 of a magnitude of at least 40 amps. In an exemplary embodiment of the present invention, the magnitude is in the range of 5 to 80 amps. In another exemplary embodiment, the magnitude range is in the range of 40 to 80 amps.

Further, in exemplary embodiments of the present invention the duration of the opposite polarity pulse 1150 is at least 2.5 ms. In other exemplary embodiments, the opposite polarity pulse has a duration in the range of 100 μs to 5 ms. In a further exemplary embodiment the duration is in the range of 0.5 ms to 5 ms. In another exemplary embodiment, the opposite polarity pulse 1150 has a duration which is in the range of 15 to 50% of the welding cycle. Further, additional embodiments of the present invention have an opposite polarity portion 1150 which has a duration in the range of 25 to 66% of the total duration of the background portion 1130 and the opposite polarity portion 1150 of the cycle. In FIG. 11, the above reference total duration would be the sum of the background portion 1130 and the opposite polarity portion 1150, while in FIG. 12 it would be the sum of the opposite polarity portion 1201 duration and the duration of the background portion (which is after the plasma boost pulse). In a further exemplary embodiment of the present invention, the opposite polarity portion has a duration which is in the range of 25 to 100% of the total duration of the background and opposite polarity portions. It should be noted that in those embodiments where the opposite polarity portion of the cycle consumes nearly all, or all, of the background duration of the cycle, the current levels should be selected such that the molten ball B that is created by the opposite polarity portion is not so large that it cannot be cleared during the remainder of the cycle. If the molten ball B gets too large the following peak pulse may be unable to clear it.

Further, it is noted that in some exemplary embodiments of the present invention, it is not necessary for the opposite polarity portion of the cycle to be timed immediately prior to the peak pulse portion, but an intermittent current portion can be inserted in between these portions. In embodiments of the present invention this intermittent current portion would be at the current level of the background (e.g., 1130 in FIG. 11) and will have a relatively short duration. In other embodiments, the current level at this intermediate portion would be lower than the background portion to allow for switching polarity of the current. The duration of the intermittent portion should be selected to ensure it does not interfere with the creation and transfer of the ball B.

FIG. 12 depicts another exemplary embodiment of a waveform cycle of the present invention. Specifically, FIG. 12 shows both a current cycle 1200 and a voltage cycle 1220. In this embodiment the portion Z of the cycle is similar to that described above and with respect to at least the waveform shown in FIG. 7 of U.S. Pat. No. 7,304,269, which is incorporated herein by reference. Accordingly, no detailed discussion of this portion Z of the waveform will be repeated here. Similar to that shown in FIG. 11, prior to the peak pulse portion 1205 an opposite polarity pulse portion 1201 is shown having a current magnitude 1203 of opposite polarity (−). The peak pulse portion 1205 begins at the conclusion of the opposite polarity pulse portion 1201, and then the remainder of the pulse cycle Z is as described previously, having at least one of a short circuit clearing pulse portion, plasma boost portion and tailout portion. Also shown in FIG. 12, is a voltage waveform cycle 1220 such that the negative voltage pulse 1221, having a magnitude 1223, is shown before the voltage peak pulse 1225.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A pulse welding apparatus, comprising:
  a welding power converter which outputs a welding waveform having a plurality of welding cycles, where each of said cycles has a first portion, a peak pulse portion and a background portion, and said power converter provides said welding waveform to an electrode and at least one workpiece to weld said at least one workpiece; and
  an AC welding module which provides each of said peak pulse portion and said background portion to said workpiece with a first polarity and said first portion to said workpiece with a second polarity, which is opposite of said first polarity,
  wherein in each of said welding cycles said first portion occurs prior to said peak pulse portion and after said background portion,
  wherein each of said welding cycles has a cycle duration and a duration of said first portion in each of said cycles is in the range of 15 to 50% of said cycle duration, and
  wherein each of said welding cycles further has a second portion between said first portion and said peak pulse portion, said second portion having a current level between a current level of said first portion and a current level of said peak pulse portion.

2. The apparatus of claim 1, wherein said first portion has a peak current magnitude which is the same as a current magnitude of said background portion.

3. The apparatus of claim 1, wherein said first portion has a peak current magnitude which is larger than a current magnitude of said background portion.

4. The apparatus of claim 1, wherein said first portion has a peak current magnitude of at least 40 amps.

5. The apparatus of claim 1, wherein said first portion has a peak current magnitude in the range of 5 to 80 amps.

6. The apparatus of claim 1, wherein said first portion has a duration of at least 2.5 ms.

7. The apparatus of claim 1, wherein said first portion has a duration in the range of 100 μs to 5 ms.

8. The apparatus of claim 1, wherein each of said waveform cycles has a short circuit clearing portion following said peak pulse portion, and said short circuit clearing portion has the same polarity as said peak pulse portion and said background portion.

9. The apparatus of claim 1, wherein said first portion has a first duration and said background portion has a second duration, and in each of said cycles said first duration is in the range of 25 to 100% of the sum of said first and second durations.

10. A method of pulse welding, comprising:
  generating a welding current waveform having a plurality of welding cycles and directing said welding current waveform to a welding electrode and a workpiece to welded, where each of said welding cycles has a first portion, a peak pulse portion and a background portion;

wherein each of said peak pulse portion and said background portion are provided with a first polarity and said first portion is provided with a second polarity, which is opposite of said first polarity, wherein in each of said welding cycles said first portion occurs prior to said peak pulse portion and after said background portion, wherein each of said welding cycles has a cycle duration and a duration of said first portion in each of said cycles is in the range of 15 to 50% of said cycle duration, and wherein each of said welding cycles further has a second portion between said first portion and said peak pulse portion, said second portion having a current level between a current level of said first portion and a current level of said peak pulse portion.

11. The method of claim 10, wherein said first portion has a peak current magnitude which is the same as a current magnitude of said background portion.

12. The method of claim 10, wherein said first portion has a peak current magnitude which is larger than a current magnitude of said background portion.

13. The method of claim 10, wherein said first portion has a peak current magnitude of at least 40 amps.

14. The method of claim 10, wherein said first portion has a peak current magnitude in the range of 40 to 80 amps.

15. The method of claim 10, wherein said first portion has a duration of at least 2.5 ms.

16. The method of claim 10, wherein said first portion has a duration in the range of 100 μs to 5 ms.

17. The method of claim 10, wherein each of said waveform cycles has a short circuit clearing portion following said peak pulse portion, and said short circuit clearing portion has the same polarity as said peak pulse portion and said background portion.

18. The method of claim 10, wherein said first portion has a first duration and said background portion has a second duration, and in each of said cycles said first duration is in the range of 25 to 100% of the sum of said first and second durations.

19. The apparatus of claim 1, wherein each of said cycles further includes a short circuit clearing pulse portion that occurs prior to said background portion and after said peak pulse portion.

20. The method of claim 10, wherein each of said cycles further includes a short circuit clearing pulse portion that occurs prior to said background portion and after said peak pulse portion.

* * * * *